United States Patent
Park

(10) Patent No.: US 12,371,291 B2
(45) Date of Patent: Jul. 29, 2025

(54) WINDING DEVICE CAPABLE OF REAL-TIME PRECISE TENSION MEASUREMENT IN WINDING PROCESS

(71) Applicant: SAMSUNG SDI CO., LTD., Yongin-si (KR)

(72) Inventor: Sang Ki Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 268 days.

(21) Appl. No.: 18/110,942

(22) Filed: Feb. 17, 2023

(65) Prior Publication Data

US 2023/0264915 A1 Aug. 24, 2023

(30) Foreign Application Priority Data

Feb. 21, 2022 (KR) .................. 10-2022-0022566

(51) Int. Cl.
*B65H 23/04* (2006.01)
*B65H 18/10* (2006.01)
*H01M 10/04* (2006.01)

(52) U.S. Cl.
CPC .......... *B65H 23/044* (2013.01); *B65H 18/10* (2013.01); *H01M 10/0409* (2013.01); *B65H 2408/23* (2013.01)

(58) Field of Classification Search
CPC .. B65H 23/044; B65H 23/18; B65H 23/1955; B65H 23/198; B65H 23/1806; B65H 18/10; H01M 10/0409; H01M 10/0404
See application file for complete search history.

(56) References Cited

U.S. PATENT DOCUMENTS

| 10,008,734 B2* | 6/2018 | Lee ................... B65H 23/1806 |
| 2016/0036086 A1 | 2/2016 | Lee et al. |
| 2017/0233205 A1* | 8/2017 | Zambonelli ....... H01M 10/0404 242/537 |

(Continued)

FOREIGN PATENT DOCUMENTS

| CN | 207977386 U | 10/2018 |
| CN | 214827742 U | 11/2021 |

(Continued)

OTHER PUBLICATIONS

Foreign Priority Search Translation dated Jan. 3, 2025 for application WO2020149638A1 (Year: 2020).*

(Continued)

*Primary Examiner* — Anna M Momper
*Assistant Examiner* — Ermia E. Melika
(74) *Attorney, Agent, or Firm* — Lee IP Law, P.C.

(57) ABSTRACT

The present disclosure relates to winding device that includes a controller for determining a winding speed corresponding to a tension profile of a substrate to be wound and for outputting a motor control signal corresponding to the winding speed. The winding device includes an electric motor for rotating a winding core to wind the substrate according to the motor control signal; and a tension sensor that is installed on a conveying roller that transports the substrate wound around the winding core to precisely sense a tension value of the substrate in real time and provide the tension value to the controller. The controller dynamically controls the winding speed of the electric motor by using the tension value.

14 Claims, 5 Drawing Sheets

(56) References Cited

U.S. PATENT DOCUMENTS

2019/0355529 A1* 11/2019 Zambonelli ....... H01M 10/0409
2022/0069332 A1* 3/2022 Jung .................... B65H 23/044

FOREIGN PATENT DOCUMENTS

| CN | 215515954 U | 1/2022 | |
|---|---|---|---|
| JP | 2009-256052 A | 11/2009 | |
| KR | 10-1899991 B1 | 9/2018 | |
| KR | 10-1900862 B1 | 9/2018 | |
| KR | 10-1900864 B1 | 9/2018 | |
| KR | 10-1914566 B1 | 10/2018 | |
| KR | 10-2201307 B1 | 1/2021 | |
| WO | WO-2020149638 A1 * | 7/2020 | ............. B65H 16/02 |

OTHER PUBLICATIONS

Mitsubishi Electric, Tension Control Complete Guide, Electromagnetic Clutches and Brakes Tension Controller, 6-125, 2019.

* cited by examiner

WINDING DEVICE CAPABLE OF REAL-TIME PRECISE TENSION MEASUREMENT IN WINDING PROCESS

CROSS-REFERENCE TO RELATED APPLICATION

This application claims priority to and the benefit of Korean Patent Application No. 10-2022-0022566, filed on Feb. 21, 2022, in the Korean Intellectual Property Office, the entire content of which is herein incorporated by reference.

BACKGROUND

1. Field

The present disclosure relates to a winding device capable of real-time precision tension measurement in a winding process.

2. Description of the Related Art

In the field of batteries, a winding process (winding, un-winding, re-winding, etc.) refers to a process of winding a positive electrode plate, a negative electrode plate, and/or a separator with an appropriate force after slitting an electrode plate. Although the function of straightly winding is being implemented by using technologies of Edge Position Control (EPC), etc., the current situation is that short-width tension control technology in which winding is performed with an appropriate force is difficult and insufficient.

Long-width (raw materials, basic materials, etc.) tension control technology is generally well known, but short-width tension control technology is problematic in that the application of existing sensors is difficult or impossible because the required tension level is very low. The level and control of the corresponding tension level may affect index improvement as well as affect quality factors, leading to defects such as deformation and cracks, of an electrode assembly or electrode group.

The above information disclosed in this Background section is only for enhancement of understanding of the background of the disclosure and therefore it may contain information that does not constitute prior art.

SUMMARY

Embodiments are directed to a winding device including a controller for determining a winding speed corresponding to a tension profile of a substrate to be wound and for outputting a motor control signal corresponding to the winding speed, an electric motor for rotating a winding core to wind the substrate according to the motor control signal, and a tension sensor that is installed on a conveying roller that transports the substrate wound around the winding core to precisely sense a tension value of the substrate in real time and provide the tension value to the controller. The controller dynamically controls the winding speed of the electric motor according to the tension value.

In some examples, the tension value may include an average tension value, a tension period, and a tension amplitude.

In some examples, the tension sensor may be installed on the fixed rod.

In some examples, the tension sensor may be installed in a partial area of the fixed rod adjacent to the extension rod and the rotating roller.

In some examples, the tension sensor may include a load cell or a strain gauge.

In some examples, the winding device may further include a data conversion unit for converting the time of the tension value into a frequency value.

In some examples, the winding device may further include an input output unit configured to input a tension profile of a substrate to be wound into the controller and output the tension value and the frequency value.

In some examples, when there is a frequency value outside a preset frequency value from the frequency value, the controller may output a warning signal through the input output unit.

BRIEF DESCRIPTION OF DRAWINGS

Features will become apparent to those of skill in the art by describing in detail exemplary embodiments with reference to the attached drawings in which.

DETAILED DESCRIPTION

The present disclosure is provided to more fully describe aspects of embodiments of the present disclosure to those skilled in the art. The following embodiments may be embodied in many different forms and should not be construed as being limited to the example embodiments set forth herein. Rather, these example embodiments are provided so that this disclosure will be thorough and complete and will convey the aspects and features of the present disclosure to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The control unit (controller) and/or other related devices or parts according to embodiments may be operated in a normal commercial computer including a central processing unit, a mass storage device, such as a hard disk or a solid state disk, a volatile memory device, an input device, such as a keyboard or mouse, and an output device, such as a monitor or printer.

In embodiment, the term "short width" may refer to a range of approximately 3 mm to approximately 80 mm. In addition, in the present disclosure, the term "low tension" may refer to a range of approximately 10 g to approximately 600 g. In one example, embodiments may relate to a winding process in which, after slitting an electrode plate, a positive electrode plate, a negative electrode plate, and/or a separator in a range of approximately 3 mm to approximately 80 mm are straightly wound with a tension in a range of approximately 10 g to approximately 600 g.

Figure 1:
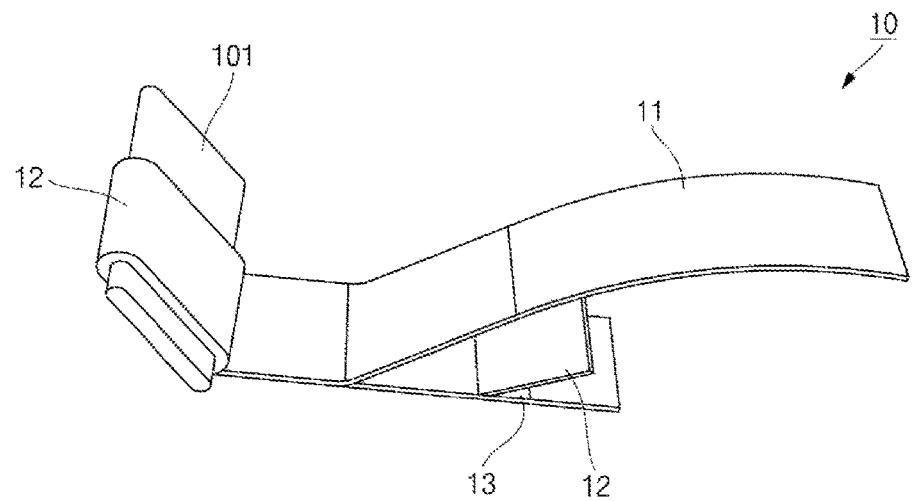
FIG. 1 is a schematic diagram showing an exemplary electrode assembly wound for an exemplary winding device according to the present disclosure.

Referring to FIG. 1, a schematic diagram showing an exemplary electrode assembly 10 wound for an exemplary winding device according to embodiments is shown.

As shown in FIG. 1, in the exemplary electrode assembly 10, a winding core 101 may rotate in a predetermined direction while a positive electrode plate 11, a separator 12, and a negative electrode plate 13 are coupled to the winding core 101. These items can be wound up in an approximate jelly roll form to complete the electrode assembly 10. After the winding process, the electrode assembly 10 may be separated from the winding core 101. In some examples, the separator 12 may be additionally disposed above the positive electrode plate 11 or below the negative electrode plate 13 to then be wound. In some examples, the electrode assembly 10 may be wound in a jelly roll form to be accommodated in a pouch, a case, or a can, etc., and then sealed, thereby completing a secondary battery.

Figure 2:
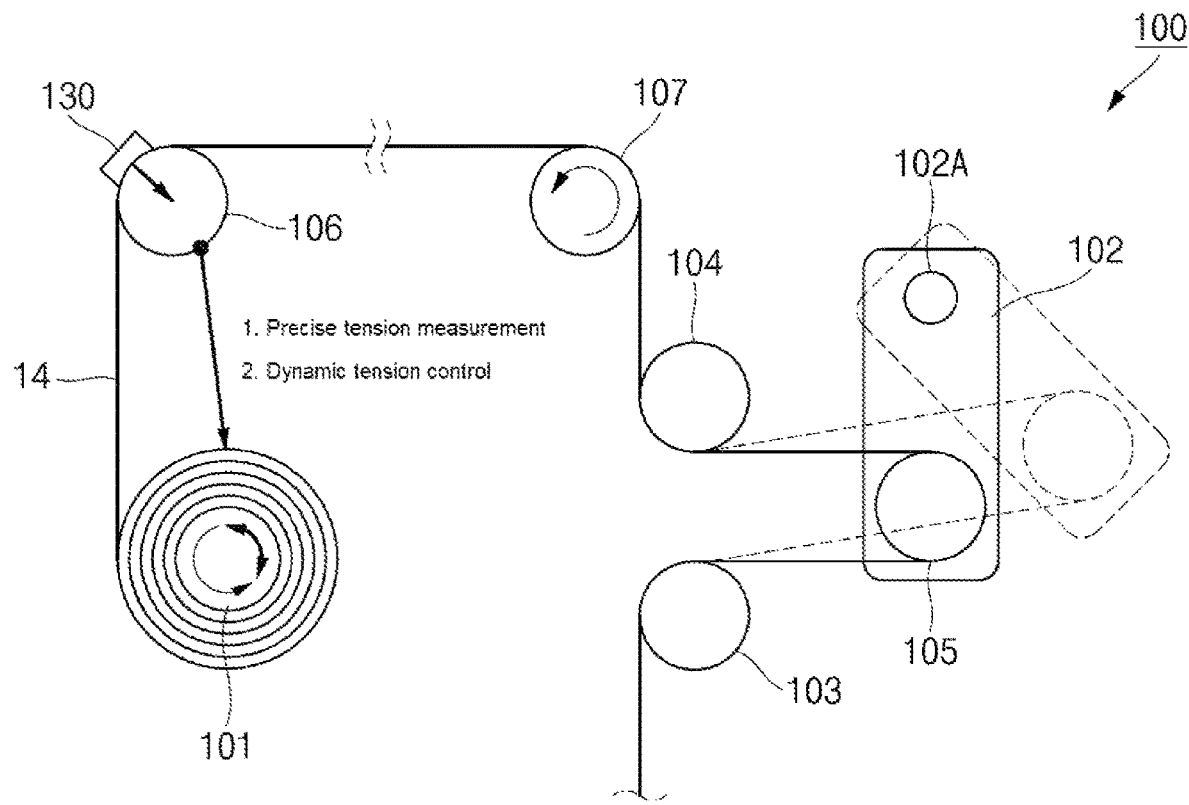
FIG. 2 is a schematic diagram showing a mechanical configuration of an exemplary winding device according to the present disclosure.

Referring to FIG. 2, a schematic diagram showing a mechanical configuration of an exemplary winding device 100 according to aspects of embodiments of the present disclosure is shown. For convenience of explanation, the positive electrode plate 11, the separator 12, and the negative electrode plate 13 will now be collectively referred to as the substrate 14.

As shown in FIG. 2, the exemplary winding device 100 may include a dancer 102 for maintaining the tension of a substrate 14 provided from an unwinder at a predetermined value, a winding core 101 for winding the substrate 14 having a constant tension supplied from the dancer 102, and one or more conveying rollers 103, 104, 105, 106, and 107 interposed between the dancer 102 and the winding core 101 to change the direction in which the substrate 14 is supplied.

In some implementations, the unwinder may unwind the substrate 14 by rotation of an electric motor. Also, the winding core 101 may wind the substrate 14 by rotation of the electric motor 120.

In some implementations, first and second conveying rollers 103 and 104 may be positioned at opposite positions, and a third conveying roller 105 may be positioned between the first and second conveying rollers 103 and 104. The third conveying roller 105 may be coupled to the dancer 102. Therefore, the substrate 14 passing through the first, second, and third conveying rollers 103, 104, and 105 may have a constant tension according to a rotation angle on the basis of a rotatable center axis 102A of the dancer 102.

In some examples, the tension sensor 130 may be directly coupled to a fourth conveying roller 106 positioned closest to the winding core 101. In some examples, the tension sensor 130 may be configured such that the winding speed or rotational speed of the winding core 101 (i.e., the rotational speed of the electric motor) can be dynamically adjusted by precisely sensing the tension value applied to the fourth conveying roller 106 in real time. In some examples, a fifth conveying roller 107 may be further interposed between the fourth conveying roller 106 and the second conveying roller 104.

Figure 3:
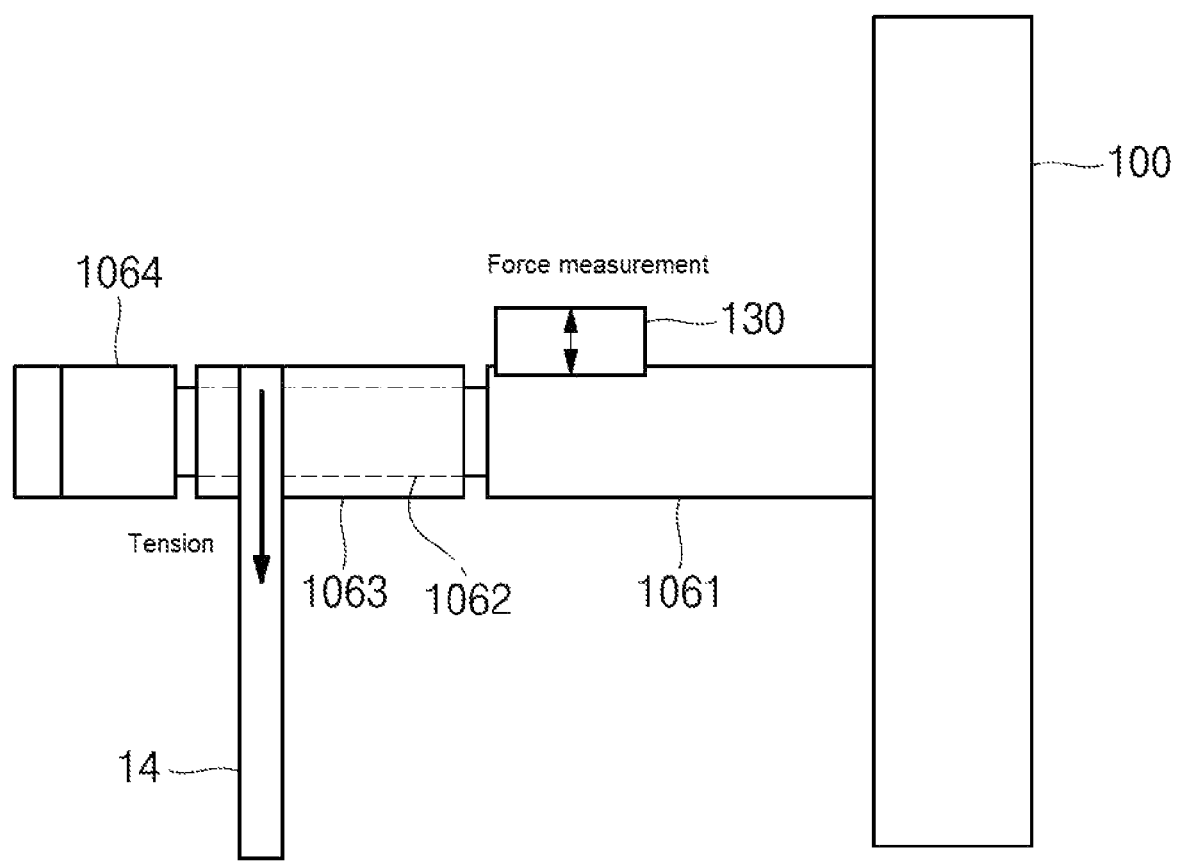
FIG. 3 is a schematic diagram showing a mechanical configuration of an exemplary tension sensor in an exemplary winding device according to the present disclosure.

Referring to FIG. 3, a mechanical configuration of an exemplary tension sensor 130 in an exemplary winding device 100 according to aspects of embodiments of the present disclosure is shown.

As shown in FIG. 3, the conveying roller 106 may include: a fixed rod 1061 that is fixed to the winding device 100 and protrudes in the longitudinal direction, an extension rod 1062 that protrudes and extends in the longitudinal direction away from the fixed rod 1061, a rotating roller 1063 that is rotatably coupled to the extension rod 1062 and allows the substrate 14 to be transported under tension, and an end block 1064 that is coupled to an end of the extension rod 1062 to prevent the rotating roller 1063 from escaping.

In some examples, a bearing may be interposed between the rotating roller 1063 and the extension rod 1062. The substrate 14 may be transferred to the winding core 101 while rotating the rotating roller 1063. In some examples, a contact area between the substrate 14 and the rotating roller 1063 may be from approximately 1% to approximately 50% of the total circumference of the rotating roller 1063.

In some examples, when the direction in which the substrate 14 enters the rotating roller 1063 is the upper side and the direction in which the substrate 14 exits the rotating roller 1063 (that is, toward the winding core 101) is the lower side, the direction in which tension is applied to the substrate 14 is may be the lower side. Accordingly, the extension rod 1062 and the fixed rod 1061 may also be subjected to the tension applied in the downward direction.

In some examples, the tension sensor 130 may be installed on the fixed rod 1061. In some examples, the tension sensor 130 may be installed in a partial region of the fixed rod 1061 adjacent to the extension rod 1062 and/or the rotating roller 1063. In some examples, the tension sensor 130 may include a piezo-type load cell or a strain gauge attached to the fixed rod 1061.

In some examples, when the direction in which the tension is applied to the substrate 14 is a downward direction, the tension applied to the substrate 14 may be precisely sensed in real time by installing the tension sensor 130 on the upper side of the fixed rod 1061.

In some examples, when the extension rod 1062 and the fixed rod 1061 are slightly bent (transformed) in the downward direction from the device 100 due to the tension applied to the substrate 14, the tension sensor 130 may sense such a minute strain (rate). In some examples, the tension sensor 130 may convert the strain into a tension value and output the converted value.

In some examples, the tension sensor 130 may have a resolution between about 0.1 g and about 2 g, or more preferably between about 0.1 g and about 1 g. Accordingly, the tension sensor 130 may have high resolution and high-speed response characteristics, and may precisely sense the tension of the substrate 14 in real time.

Figure 4:
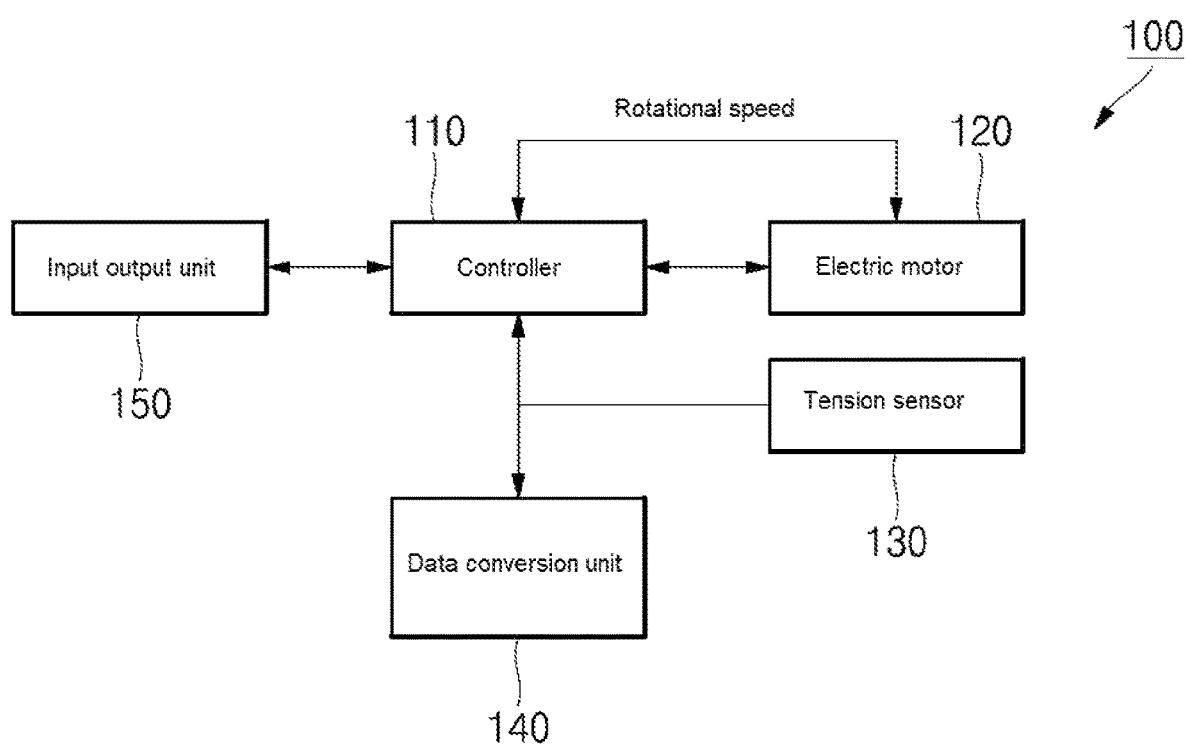
FIG. 4 is a block diagram showing an electrical configuration of an exemplary winding device according to embodiments of the present disclosure.

Referring to FIG. 4, an electrical configuration of an exemplary winding device 100 according to aspects of embodiments of the present disclosure is shown. As shown in FIG. 4, the exemplary winding device 100 according to aspects of embodiments of the present disclosure may include a controller 110, an electric motor 120, and a tension sensor 130. In some examples, the exemplary winding device 100 may further include a data conversion unit 140 and/or an input output unit 150.

The controller 110 may receive a winding control program and a tension profile and store the same. The controller 110 may also determine the winding speed corresponding to the tension profile of the substrate 14 to be wound, and may output a motor control signal corresponding to the winding speed to the electric motor 120.

In some examples, the controller 110 may store the winding speed corresponding to the tension profile in the form of a look-up table or in the form of a mathematical expression. In some examples, the controller 110 may mutually communicate with the electric motor 120, the tension sensor 130, and the data conversion unit 140, and may receive and process various user commands. In some examples, the tension profile may include a tension value for each winding cycle and a winding speed for each tension value.

The electric motor 120 may rotate the winding core 101 winding the substrate 14 at a predetermined speed according to a motor control signal. In some examples, the electric motor 120 may include a step motor or a servo motor. In some examples, the electric motor 120 may provide (feedback) the rotational speed (or the winding speed) to the controller 110. In some examples, if the rotational speed of the electric motor 120 is high, high tension may be applied to the substrate 14, and if the rotational speed of the electric motor 120 is low, low tension may be applied to the substrate 14. The reverse is also possible.

The tension sensor 130 may be installed on the conveying roller 106 that transports the substrate 14 provided on the winding core 101 to precisely sense the tension value (tension data) of the substrate 14 in real time. The tension sensor 130 may provide the sensed tension value to the controller 110. In some examples, the tension value may include a tension average value, a tension period, and/or a tension amplitude.

In this way, according to aspects of embodiments of the present disclosure, the winding speed (i.e., the rotational speed) of the electric motor 120 (i.e., the winding core 101) can be controlled by using the tension value obtained from the tension sensor 130. For example, after precisely sensing the tension value applied to the conveying roller 106 in real time, the controller 110 may dynamically synchronize and control the winding speed (or the rotational speed) of the winding core 101 such that the tension value applied to the substrate 14 matches the previously input tension profile.

The data conversion unit 140 may provide a frequency value by converting a time component included in the tension value into a frequency component. In some examples, the data conversion unit 140 may include a Fast Fourier Transform (FFT) filter and/or a Kalman filter.

The input output unit 150 may be configured to input the tension profile of the substrate 14 to be wound into the controller 110 in advance, and output the tension value and frequency value to a screen. In some examples, the controller 110 may output a warning signal through the input output unit 150 and/or a separate alarm unit when there is a frequency value outside of a preset frequency value.

In this way, according to aspects of embodiments of the present disclosure, by converting the tension value including a time component into a frequency value, it may be determined whether the winding process is proceeding normally or abnormally.

Figure 5:
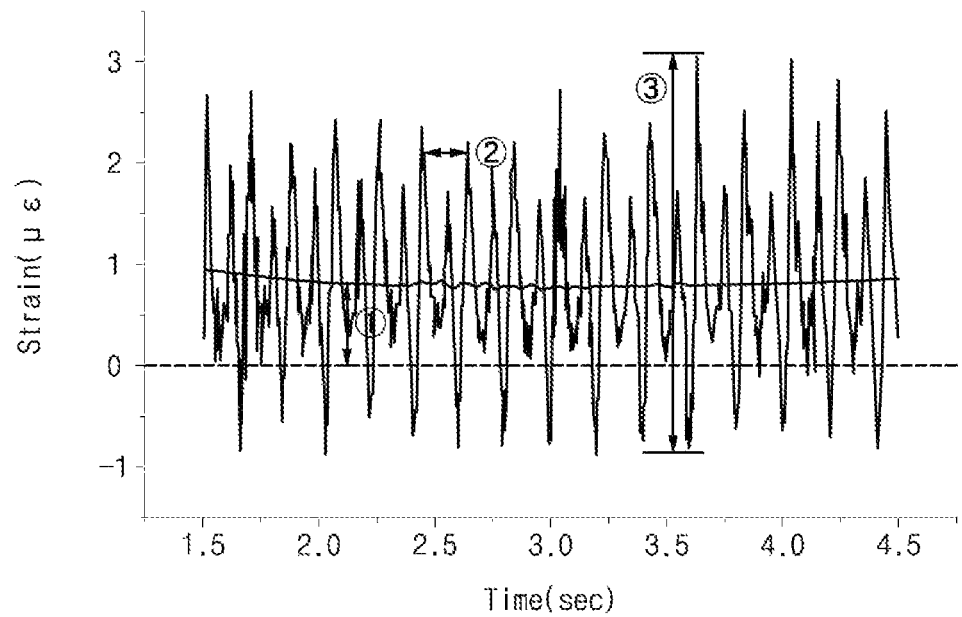
FIG. 5 is a graph showing a relationship between time and tension measured by an exemplary tension sensor in an exemplary winding device according to embodiments of the present disclosure.

Referring to FIG. 5, a relationship between time and tension may be measured by an exemplary tension sensor 130 in an exemplary winding device 100 according to aspects of embodiments of the present disclosure. In FIG. 5, the X-axis as shown in FIG. 5 indicates time (sec), and the Y-axis indicates strain (με).

As shown in FIG. 5, the tension value of the substrate 14 sensed by the tension sensor 130 may include an average tension value (①), a tension period (②), and/or a tension amplitude (③).

The term "average tension value (①)" refers to an average value of tension values sensed by the tension sensor 130. In embodiments according to the present disclosure, the average tension value may be smaller than approximately 1με. The term "tension period (②)" refers to a sensing period (i.e., is related to response speed and resolution) determined by the tension sensor 130. In embodiments of the present disclosure, the tension period may be approximately 0.1 to approximately 0.3 s. The term "tension amplitude (③)" refers to a bandwidth (the higher the bandwidth, the more advantageous) based on the tension sensor 130. In embodiments of the present disclosure, the bandwidth may be approximately −1με to approximately 3με. In addition, in embodiments of the present disclosure, one winding cycle may be approximately 10 seconds.

In this way, according to embodiments of the present disclosure, the tension value for the substrate 14 having a short width and low tension can be precisely sensed, and by precisely acquiring three types of data in real time, such as the average tension value, the tension cycle, and the tension amplitude, the tension of the substrate 14 being wound can be more dynamically controlled.

Figure 6A:
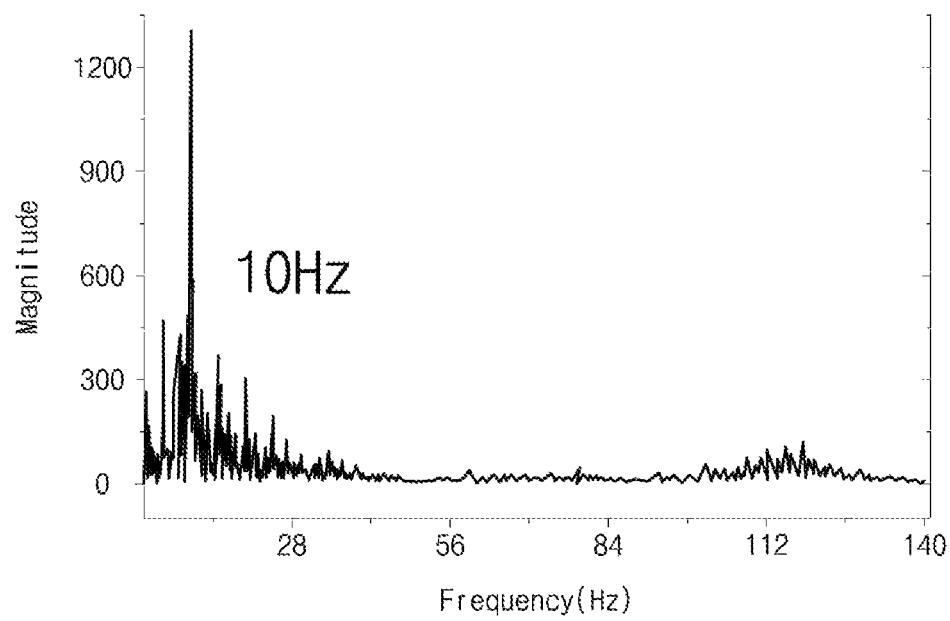
FIGS. 6A and 6B are graphs showing conversion results by a data conversion unit in an exemplary winding device according to embodiments of the present disclosure.
Figure 6B:
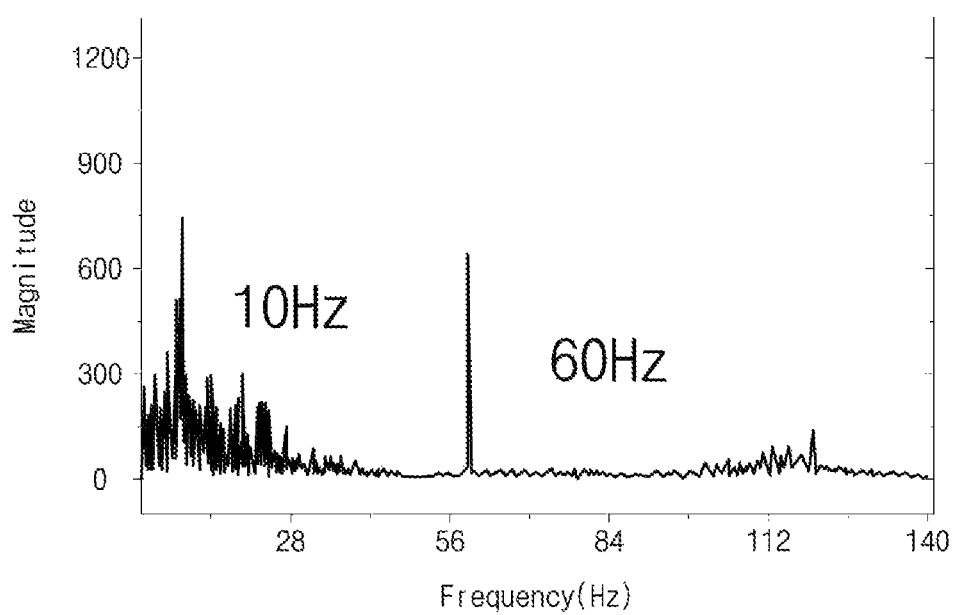

Referring to FIGS. 6A and 6B, graphs showing conversion results by a data conversion unit 140 in an exemplary winding device 100 according to embodiments of the present disclosure are shown. In FIGS. 6A and 6B, the X-axis indicates frequency (Hz) and the Y-axis indicates magnitude.

In some examples, if one winding cycle is 10 seconds and the normal winding process is in progress, peak data of 10 Hz mainly appears, as shown in FIG. 6A. However, if peak data of, for example, 60 Hz appears in addition to the peak data of 10 Hz, as shown in FIG. 6B, it can be determined that a problem has occurred in the winding process and follow-up measures (e.g., stopping the winding process and adjusting parameters of winding equipment) may need to be taken.

Aspects of embodiments of the present disclosure may provide a winding device capable of real-time precise tension measurement during a winding process, wherein the tension value generated during the winding process of the substrate (electrode plate and/or separator) having short width and low tension is precisely measured and monitored in real time and the measured tension value of the substrate and the winding speed of the substrate are dynamically synchronized.

By way of summation and review, tension control in a conventional winding process, as disclosed in, could be performed by using general instruments and devices, such as potentiometers and dancers, which are mainly for maintaining the tension on supply units of an electrode plate and/or a separator. However, there has been a problem that real-time tension generated during a winding process could not be monitored and controlled.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A winding device comprising:
   a controller for determining a winding speed corresponding to a tension profile of a substrate to be wound and for outputting a motor control signal corresponding to the winding speed;
   an electric motor for rotating a winding core to wind the substrate according to the motor control signal; and
   a tension sensor that is installed on a conveying roller that transports the substrate wound around the winding core to precisely sense a tension value of the substrate in real time and provide the tension value to the controller,
   wherein the tension value includes an average tension value, a tension period, and a tension amplitude, and
   wherein the controller dynamically controls the winding speed of the electric motor by using the tension value.

2. The winding device as claimed in claim 1, wherein the conveying roller includes:
   a fixed rod fixed to the winding device and protruding in a longitudinal direction;
   an extension rod protruding and extending from the fixed rod in the longitudinal direction; and
   a rotating roller rotatably coupled to the extension rod, the rotating roller allowing the substrate to be conveyed under tension.

3. The winding device as claimed in claim 2, wherein the tension sensor is installed on the fixed rod.

4. The winding device as claimed in claim 3, wherein the tension sensor is installed in a partial area of the fixed rod adjacent to the extension rod and the rotating roller.

5. The winding device as claimed in claim 1, wherein the tension sensor includes a load cell or a strain gauge.

6. The winding device as claimed in claim 1, further comprising a data conversion unit for converting a time of the tension value into a frequency value.

7. The winding device as claimed in claim 6, further comprising an input output unit configured to input a tension profile of a substrate to be wound into the controller and to output the tension value and the frequency value.

8. The winding device as claimed in claim 7, wherein when a frequency value outside a preset frequency value is output by the input output unit, the controller outputs a warning signal through the input output unit.

9. The winding device as claimed in claim 1, further including a dancer for adjusting tension applied to the substrate.

10. The winding device as claimed in claim 1, wherein the tension sensor has a resolution of about 0.1 g to about 2 g.

11. The winding device as claimed in claim 2, wherein a contact area between the substrate and the rotating roller is about 1% to about 50% of a total circumference of the rotating roller.

12. The winding device as claimed in claim 1, wherein the tension profile includes a tension value for each winding cycle and a winding speed for each tension value.

13. The winding device as claimed in claim 1, wherein the tension period is about 0.1 seconds to about 0.3 seconds.

14. The winding device as claimed in claim 1, wherein the controller receives and stores a winding control program.

* * * * *